(12) United States Patent
Kaneko

(10) Patent No.: US 11,094,054 B2
(45) Date of Patent: Aug. 17, 2021

(54) INSPECTION APPARATUS, INSPECTION SYSTEM, AND INSPECTION METHOD

(71) Applicant: Hitomi Kaneko, Saitama (JP)

(72) Inventor: Hitomi Kaneko, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 353 days.

(21) Appl. No.: 16/212,829

(22) Filed: Dec. 7, 2018

(65) Prior Publication Data
US 2019/0180431 A1 Jun. 13, 2019

(30) Foreign Application Priority Data
Dec. 8, 2017 (JP) .............................. JP2017-236290

(51) Int. Cl.
*G06K 9/00* (2006.01)
*G06T 7/00* (2017.01)
(Continued)

(52) U.S. Cl.
CPC .......... *G06T 7/001* (2013.01); *B41F 33/0036* (2013.01); *G03G 15/5062* (2013.01);
(Continued)

(58) Field of Classification Search
CPC ................. G06T 7/0002; G06T 7/001; G06T 2207/10008; G06T 2207/30144; G06T 2207/30176; G06K 15/025; G06K 15/026; G06K 15/027; G06K 9/00483; G06K 9/03; G06K 9/036; G06K 9/209; G03G 15/5062; G03G 15/5095; G03G 15/55; G03G 15/553; H04N 1/00002; H04N 1/00005; H04N 1/00015; H04N 1/00026; H04N 1/00029; H04N 1/00045; H04N 1/00047; H04N 1/00063; H04N 1/00681; H04N 1/38; B41F 33/0036
(Continued)

(56) References Cited

U.S. PATENT DOCUMENTS 6,065,938 A * 5/2000 Bartsch .................... F01D 5/30
416/219 R
6,834,929 B1 * 12/2004 Adams .................. B41J 11/008
347/14
7,076,086 B2 * 7/2006 Miyake .............. H04N 1/00002
382/112
(Continued)

FOREIGN PATENT DOCUMENTS

JP 9-314925 12/1997
JP 2007-033247 2/2007
(Continued)

*Primary Examiner* — Eric Rush
(74) *Attorney, Agent, or Firm* — Harness, Dickey & Pierce, P.L.C.

(57) ABSTRACT

An inspection apparatus includes a reading device and a processor. The reading device is configured to read printed matter with an image that is printed on a printing medium based on a source image to generate a read image. The processor is configured to generate a reference image based on the source image, determine whether an inspection is to be executed based on a size of the source image and a size of the printing medium, and compare the reference image with the read image to inspect quality of the printed matter in response to a determination that the inspection is to be executed.

19 Claims, 15 Drawing Sheets

(51) Int. Cl.
  *G03G 15/00* (2006.01)
  *G06K 9/03* (2006.01)
  *G06K 15/02* (2006.01)
  *H04N 1/00* (2006.01)
  *B41F 33/00* (2006.01)

(52) U.S. Cl.
  CPC ....... *G03G 15/5095* (2013.01); *G03G 15/553* (2013.01); *G06K 9/036* (2013.01); *G06K 15/027* (2013.01); *G06T 7/0002* (2013.01); *H04N 1/00005* (2013.01); *H04N 1/00015* (2013.01); *H04N 1/00045* (2013.01); *H04N 1/00047* (2013.01); *H04N 1/00681* (2013.01); *G06T 2207/30144* (2013.01)

(58) Field of Classification Search
  USPC ......... 382/100, 112, 141, 312, 325; 358/1.1, 358/1.2, 305, 405, 501, 504, 505, 528, 358/538, 539; 347/19, 179, 212; 399/9, 399/15
  See application file for complete search history.

(56) References Cited

U.S. PATENT DOCUMENTS

| | | | |
|---|---|---|---|
| 9,007,658 B2* | 4/2015 | Ito | G06T 7/001 |
| | | | 358/2.1 |
| 9,213,894 B2* | 12/2015 | Yamagishi | G06T 7/001 |
| 9,233,551 B2* | 1/2016 | Kaneko | B41J 29/393 |
| 9,524,545 B2* | 12/2016 | Fukase | G06T 7/001 |
| 9,536,297 B2* | 1/2017 | Araki | G06T 7/001 |
| 10,102,425 B2* | 10/2018 | Yoshizumi | G06K 9/00442 |
| 2006/0103887 A1* | 5/2006 | Enomoto | H04N 1/00132 |
| | | | 358/296 |
| 2006/0115127 A1* | 6/2006 | Hatayama | G06K 9/036 |
| | | | 382/112 |
| 2014/0079292 A1 | 3/2014 | Kaneko et al. | |
| 2019/0033765 A1* | 1/2019 | Haga | H04N 1/00015 |

FOREIGN PATENT DOCUMENTS

| | | |
|---|---|---|
| JP | 2014-074710 | 4/2014 |
| JP | 2014-153553 | 8/2014 |
| JP | 2016-178557 | 10/2016 |

* cited by examiner

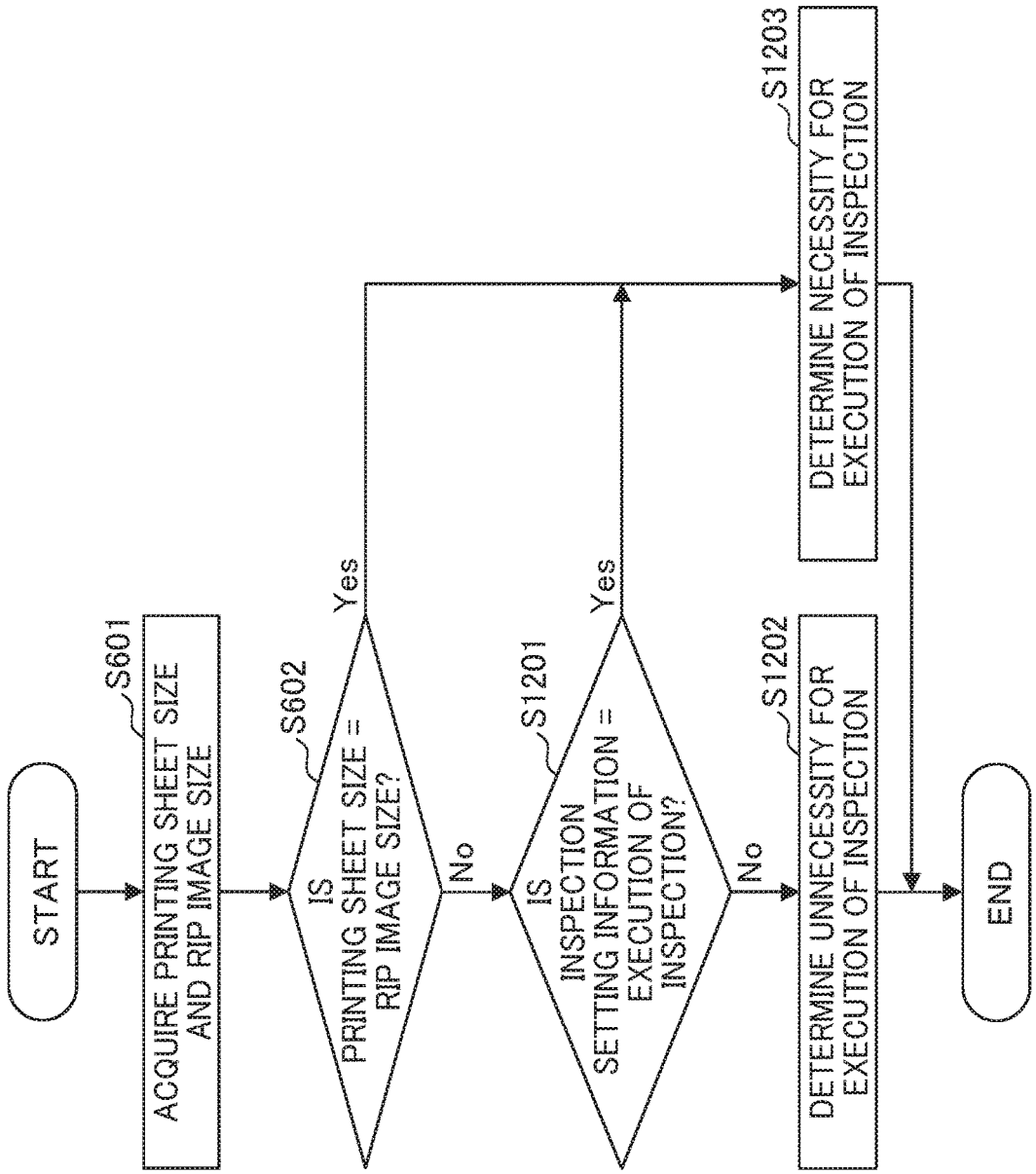

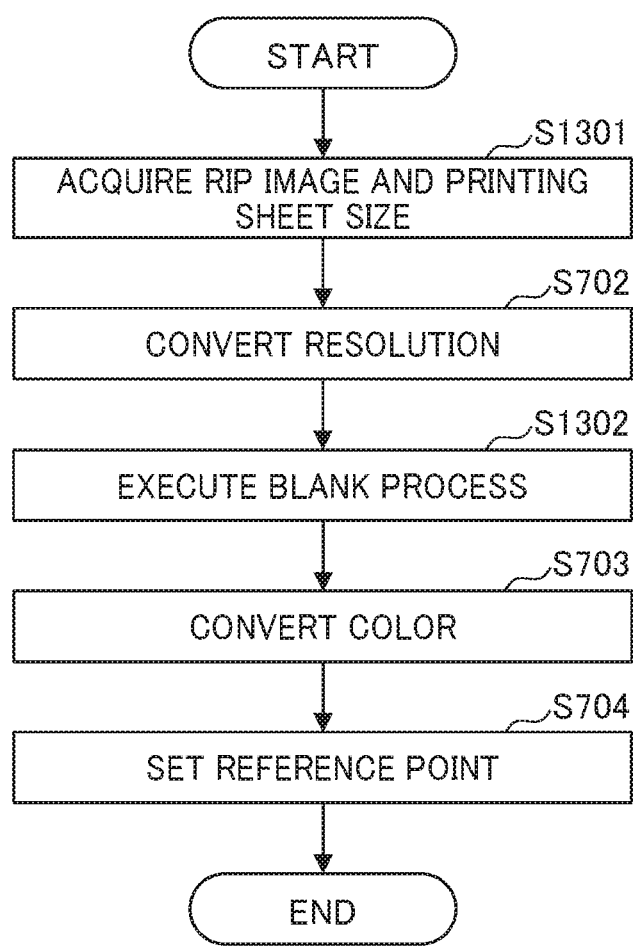

G200

INSPECTION SETTING AT TIME WHEN FORCIBLE PRINTING IS PERFORMED

DO YOU INTEND COMPARISON INSPECTION TO BE EXECUTED IF PRINTING SHEET SIZE DIFFERS FROM RIP IMAGE SIZE?

- EXECUTE INSPECTION — G210
- PARTIALLY EXECUTE INSPECTION — G220
- DO NOT EXECUTE INSPECTION — G230

INSPECTION APPARATUS, INSPECTION SYSTEM, AND INSPECTION METHOD

CROSS-REFERENCE TO RELATED APPLICATION

This patent application is based on and claims priority pursuant to 35 U.S.C. § 119 to Japanese Patent Application No. 2017-236290, filed on Dec. 8, 2017, in the Japan Patent Office, the entire disclosure of which is hereby incorporated by reference herein.

BACKGROUND

Technical Field

Exemplary aspects of the present disclosure relate to an inspection apparatus, an inspection system, and an inspection method.

Related Art

In production printing, the quality of printed matter output by a printing apparatus is inspected, conventionally including comparing a printed image with a master reference image. The printed image is acquired using a device such as a scanner.

SUMMARY

In at least one embodiment of this disclosure, there is provided an improved inspection apparatus that includes a reading device and a processor. The reading device is configured to read printed matter with an image that is printed on a printing medium based on a source image to generate a read image. The processor is configured to generate a reference image based on the source image, determine whether an inspection is to be executed based on a size of the source image and a size of the printing medium, and compare the reference image with the read image to inspect quality of the printed matter in response to a determination that the inspection is to be executed.

Further provided is an improved inspection system that includes the inspection apparatus.

Further provided is an inspection method that includes reading, generating, determining, and comparing. The reading reads printed matter with an image that is printed on a printing medium based on a source image to generate a read image. The generating generates a reference image based on the source image. The determining determines whether an inspection is to be executed based on a size of the source image and a size of the printing medium. The comparing compares the reference image with the read image to inspect quality of the printed matter if it is determined that an inspection is to be executed.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 12 is a flowchart illustrating one example of a process for determining whether execution of inspection is necessary performed by the image forming system according to the second embodiment;

FIG. 13 is a flowchart illustrating one example of a process for generating a reference image performed by the image forming system according to the second embodiment;

Figure 1:
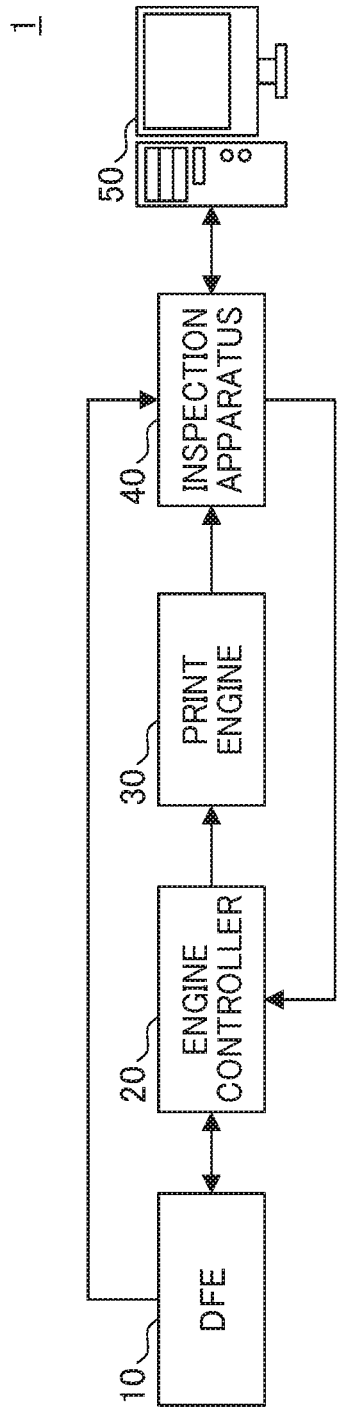
FIG. 1 is a diagram illustrating one example of a configuration of an image forming system including an inspection apparatus and a print engine according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity.

However, the disclosure of this patent specification is not intended to be limited to the specific terminology so selected and it is to be understood that each specific element includes all technical equivalents that have the same function, operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

First Embodiment

<Overall Configuration of Image Forming System 1>

FIG. 1 illustrates one example of an overall configuration of an image forming system 1 according to a first embodiment.

As illustrated in FIG. 1, the image forming system 1 according to the present embodiment includes a digital front end (DFE) 10, an engine controller 20, a print engine 30, an inspection apparatus 40, and a user terminal 50.

The DFE 10 as an image processing apparatus performs a raster image processor (RIP) process based on a print job to generate image data (i.e., bitmap data) of a print target, and outputs the generated image data to the engine controller 20. Moreover, the DFE 10 transmits the generated image data to the inspection apparatus 40. Hereinafter, the bitmap data generated by the DFE 10 is also referred to as "a RIP image". The RIP image serves as a source image for generation of printed matter.

The engine controller 20, based on the RIP image received from the DFE 10, controls the print engine 30 to form an image.

The print engine 30 as an image forming apparatus, as controlled by the engine controller 20, executes image formation output to a printing sheet of a recording medium based on the RIP image. The execution of the image formation output to the printing sheet outputs printed matter with an image formed on the printing sheet. In addition to such a printing sheet, a material such as a film or plastic may be used as a recording medium as long as the sheet material can be a target of image formation output.

The inspection apparatus 40, based on the RIP image received from the DFE 10, generates a master image (hereinafter also referred to as "a reference image") to be a reference for inspection of a result of the image formation output performed by the print engine 30. Moreover, the inspection apparatus 40 generates a read image by reading printed matter that is a result of the image formation output performed by the print engine 30. The inspection apparatus 40 compares the read image with the reference image, thereby inspecting a result of the image formation output performed by the print engine 30 (i.e., quality of printed matter is inspected).

If the inspection apparatus 40 determines that a result of the image formation output performed by the print engine 30 has a defect, the inspection apparatus 40 notifies the engine controller 20 of a page that is identified as defective. Accordingly, the engine controller 20 orders reprinting, so that the defective page is reprinted.

Alternatively, for example, information about the page identified as defective can be displayed on the user terminal 50, or the information about the page identified as defective can be retained in a device such as the engine controller 20 and the inspection apparatus 40, without printing.

The user terminal 50 as an information processing terminal is used, for example, when a user designates a parameter to be used for inspection or checks a result of inspection performed by the inspection apparatus 40.

<Hardware Configuration of Inspection Apparatus 40>

Figure 2:
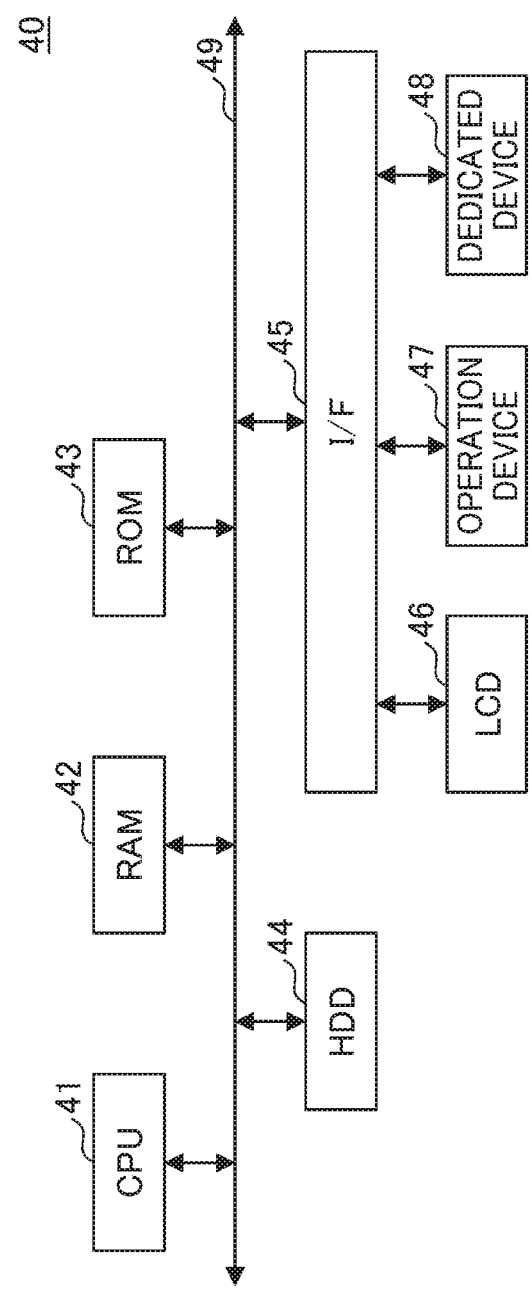
FIG. 2 is a diagram illustrating one example of a hardware configuration of the inspection apparatus according to the first embodiment.

FIG. 2 illustrates one example of a hardware configuration of the inspection apparatus 40 according to the present embodiment.

As illustrated in FIG. 2, the inspection apparatus 40 according to the present embodiment includes a hardware configuration similar to a general information processing apparatus such as a personal computer (PC) and a server. That is, the inspection apparatus 40 includes a central processing unit (CPU) 41 as a processor, a random access memory (RAM) 42, a read only memory (ROM) 43, a hard disk drive (HDD) 44, and an interface (I/F) 45. The CPU 41, the RAM 42, the ROM 43, the HDD 44, and the I/F 45 are connected via a bus 49. Moreover, the inspection apparatus 40 includes a liquid crystal display (LCD) 46, an operation device 47, and a dedicated device 48 that are connected to the I/F 45.

The CPU 41 as a computation device retrieves data or programs from a storage device such as the ROM 43 and the HDD 44 to the RAM 42 to execute a process, thereby comprehensively controlling the inspection apparatus 40 and rendering the inspection apparatus 40 function. The RAM 42 is a volatile semiconductor memory that temporarily retains programs and data. The ROM 43 is a non-volatile semiconductor memory that can retain programs and data even if a power source is turned off.

The HDD 44 is a non-volatile storage device in which programs and data are stored. The program or data to be stored in the HDD 44 includes an operating system (OS) that is basic software for comprehensive control of the inspection apparatus 40, and application software that provides various functions on the OS.

The inspection apparatus 40 can include a drive device (e.g., a solid state drive (SSD)) that uses a flash memory as a storage medium, instead of the HDD 44 or with the HDD 44.

The I/F 45 connects the bus 49 and various hardware or a network. The LCD 46 as a user interface is used, for example, when a user checks a result of the process performed by the inspection apparatus 40. The operation device 47 as a user interface such as a keyboard and a mouse is used when a user inputs various information to the inspection apparatus 40.

The inspection apparatus 40 may not include at least one of the LCD 46 and the operation device 47.

The dedicated device 48 as hardware provides a dedicated function. Examples of the dedicated device 48 include a computation device such as an application specific integrated circuit (ASIC) for a high-speed image process and a reading device that reads an image output on a sheet.

The inspection apparatus 40 according to the present embodiment includes the hardware configuration illustrated in FIG. 2, thereby performing various processes described below.

<Sheet Conveyance Path and Mechanical Configuration of Print Engine 30 and Inspection Apparatus 40>

Figure 3:
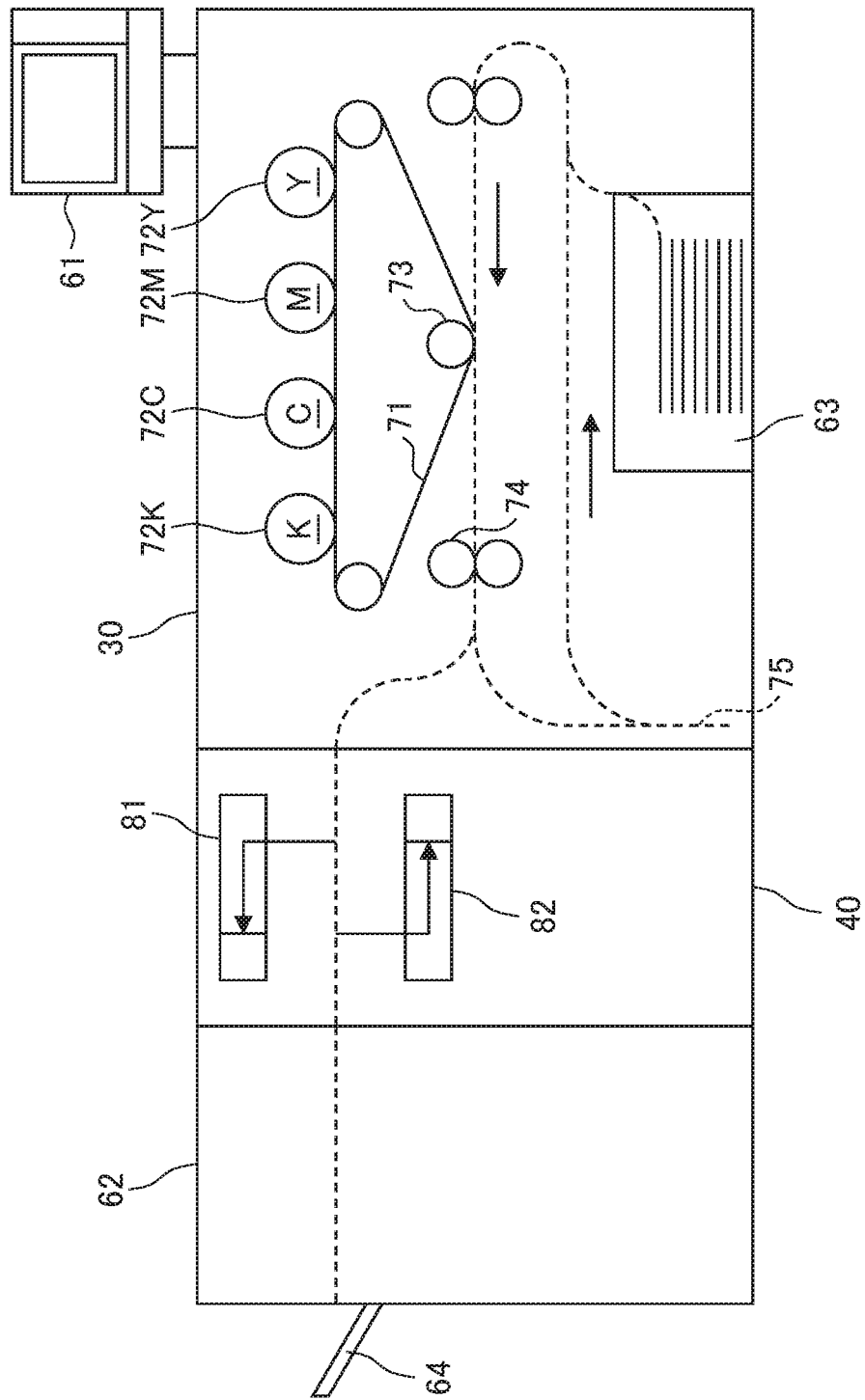
FIG. 3 is a diagram illustrating one example of a sheet conveyance path and a mechanical configuration of the print engine and the inspection apparatus according to the first embodiment.

FIG. 3 illustrates one example of a sheet conveyance path and a mechanical configuration of the print engine 30 and the inspection apparatus 40 according to the embodiment.

As illustrated in FIG. 3, an input output device 61 that provides a user interface is connected to the print engine 30. The print engine 30 includes photoconductor drums 72Y, 72M, 72C, and 72K for respective colors of yellow (Y), magenta (M), cyan (C), and key plate (K) along a conveyance belt 71 (if color differentiation is not necessary, "a photoconductor drum 72" is hereinafter described as a representative of the photoconductor drums 72Y, 72M, 72C, and 72K). That is, along the conveyance belt 71 as an intermediate transfer belt on which an intermediate transfer image to be transferred to a sheet (one example of a recording medium) to be fed from a sheet tray 63 is formed, the photoconductor drums 72Y, 72M, 72C, and 72K are arranged in order from an upstream side in a conveyance direction of the conveyance belt 71.

Images that are developed with respective colors of toner on surfaces of the photoconductor drums 72Y, 72M, 72C, and 72K are overlapped and transferred to the conveyance belt 71, thereby forming a full color image. The full color image formed on the conveyance belt 71 is transferred using a function of a transfer roller 73 to a surface of a sheet conveyed on a conveyance path indicated by a broken line illustrated in FIG. 2.

The sheet with the image is further conveyed to a fixing roller 74 in which the image is fixed. Then, the sheet with the fixed image is conveyed to the inspection apparatus 40. If duplex printing is performed, the sheet with the image formed and fixed on one side is conveyed to a reverse path 75. After being reversed, the sheet is again conveyed to a transfer position, and an image is transferred to the other side of the sheet by the transfer roller 73.

The inspection apparatus 40 includes a reading device 81. The reading device 81 reads a surface of a sheet on the conveyance path inside the inspection apparatus 40 to generate a read image. Moreover, the inspection apparatus 40 can include a reading device 82. If duplex printing is performed, two sides of a sheet are read by the respective reading devices 81 and 82, so that read images are generated.

After the sheet surface is read, the sheet is further conveyed inside the inspection apparatus 40. Then, the sheet is conveyed to a stacking unit 62. The sheet conveyed to the stacking unit 62 is ejected to an ejection tray 64.

<Functional Configuration of Image Forming System 1>

Figure 4:
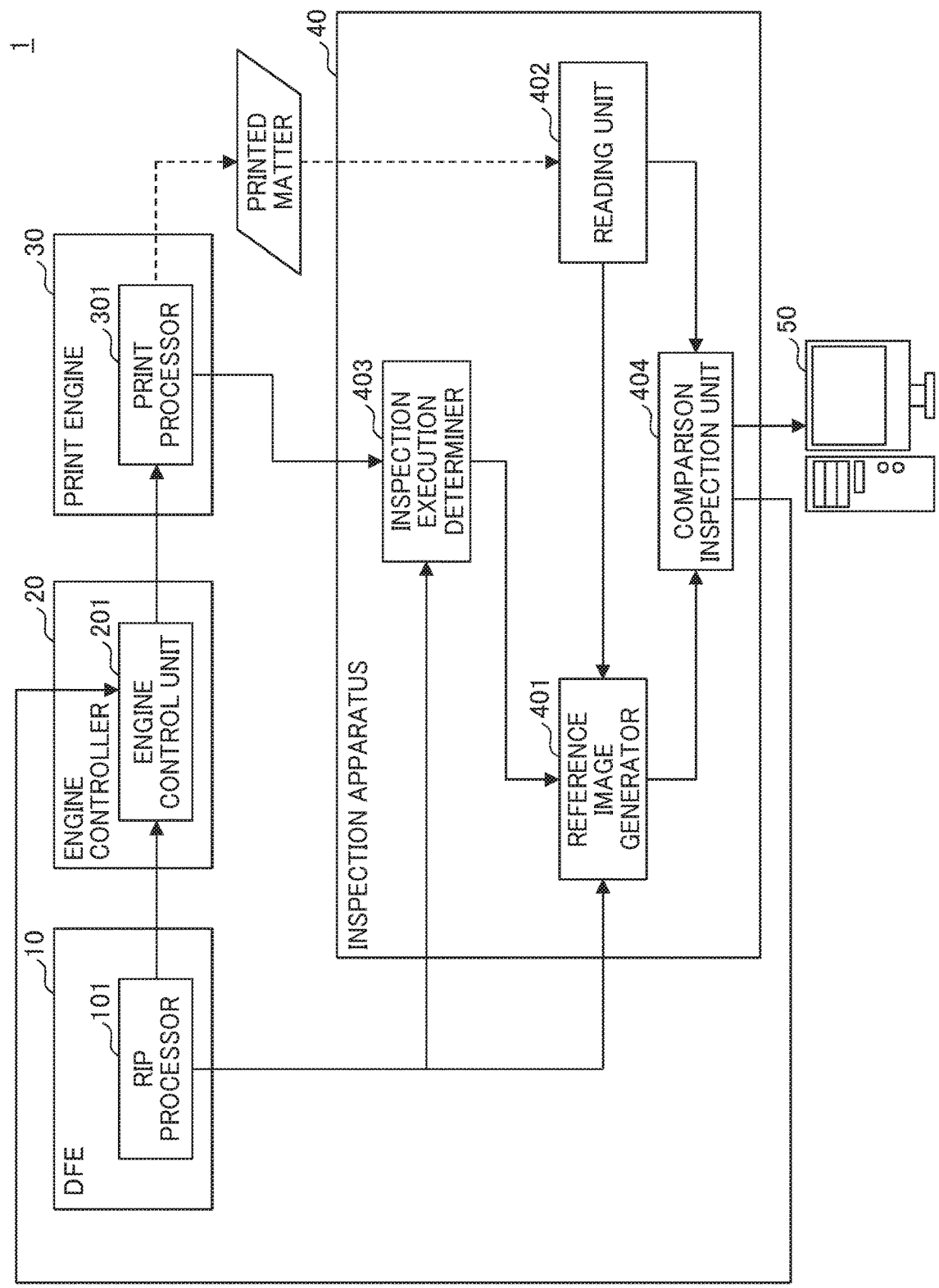
FIG. 4 is a diagram illustrating one example of a functional configuration of the image forming system according to the first embodiment.

A functional configuration of each of the DFE 10, the engine controller 20, the print engine 30, and the inspection apparatus 40 in the image forming system 1 according to the present embodiment is described. FIG. 4 illustrates one example of a functional configuration of the image forming system 1.

<<DFE 10>>

As illustrated in FIG. 4, the DFE 10 according to the present embodiment includes a RIP processor 101. The RIP processor 101 functions by a process in which one or more programs installed in the DFE 10 are executed by the CPU 41.

The RIP processor 101 generates a RIP image based on a print job received from a terminal device connected to the DFE 10 via a network or a print job stored in the DFE 10. For example, the RIP processor 101 generates a RIP image from an image in a page description language (PDL) such as PostScript or an image in a format such as a tagged image file format (TIFF) included in a print job. In one example, a RIP image hereinafter has a resolution of 600 dots per inch (dpi) with CMYK.

A print job includes print various settings such as a printing sheet size, single-sided/duplex printing, and color/monochrome printing. For example, a value of such a print setting can be set in a terminal device connected to the DFE 10 via network, or a default value of such a print setting can be set.

Moreover, the RIP processor 101 transmits the generated RIP image and the print setting to the engine controller 20. In addition, the RIP processor 101 transmits the generated RIP image and a RIP image size to the inspection apparatus 40.

<<Engine Controller 20>>

As illustrated in FIG. 4, the engine controller 20 of the present embodiment includes an engine control unit 201. The engine control unit 201 functions by a process in which one or more programs installed in the engine controller 20 are executed by the CPU 41.

The engine control unit 201 renders the print engine 30 execute image formation output based on the RIP image and the print setting received from the DFE 10.

<<Print Engine 30>>

As illustrated in FIG. 4, the print engine 30 of the present embodiment includes a print processor 301. The print processor 301 functions by a process in which one or more programs installed in the print engine 30 are executed by the CPU 41.

The print processor 301 acquires the RIP image and the print setting transmitted from the engine controller 20. According to the print setting, the print processor 301 forms and outputs a print image to a printing sheet based on the RIP image. Thus, the print processor 301 outputs printed matter which is the printing sheet with the image.

Moreover, the print processor 301 transmits a printing sheet size included in the print setting to the inspection apparatus 40.

<<Inspection Apparatus 40>>

As illustrated in FIG. 4, the inspection apparatus 40 according to the present embodiment includes a reference image generator 401, a reading unit 402, an inspection execution determiner 403, and a comparison inspection unit 404. Each of the reference image generator 401, the reading unit 402, the inspection execution determiner 403, and the comparison inspection unit 404 functions by a process in which one or more programs installed in the inspection apparatus 40 are executed by the CPU 41.

The reference image generator 401 generates a reference image from the RIP image received from the DFE 10. The reference image represents an image to be a reference for inspection of a result of image formation output performed by the print engine 30 (i.e., printed matter provided by the print engine 30).

The reading unit 402 reads the printed matter output by the print engine 30 to generate a read image. The reading unit 402 functions by the reading device 81 or 82 disposed inside the inspection apparatus 40. In one example, the read image hereinafter has a resolution of 200 dots per inch (dpi) with red, green, and blue (RGB).

The inspection execution determiner 403 determines whether comparison inspection that compares the reference image with the read image is executed, depending on whether the RIP image received from the DFE 10 matches the printing sheet size received from the print engine 30. That is, for example, if the RIP image size does not match the printing sheet size, the inspection execution determiner 403 determines that the comparison inspection is not to be executed since the printed matter is forcibly printed. The inspection execution determiner 403 makes such a determination since high quality of printed matter is not demanded in many cases if forcible printing is performed.

The term "forcible printing" used herein represents a function of forcibly performing printing even if a size of a source image input to a printer does not match a size of a printing sheet of an output medium. In the forcible printing, if a size of a printing sheet is smaller than a size of a source image, the source image is printed with one portion of the source image trimmed. Accordingly, in general, when the forcible printing is used, high quality of printed matter is not demanded in many cases.

However, the use of forcible printing for generation of printed matter may not be considered. In such a case, inspection is executed even if high quality of the printed matter is not demanded. Such inspection can degrade productivity. Accordingly, if printed matter is generated using forcible printing, the inspection execution determiner 403 determines that the comparison inspection is not to be executed.

If the inspection execution determiner 403 determines that the comparison inspection is to be executed, the comparison inspection unit 404 executes the comparison inspection of the reference image and the read image. With the comparison between the reference image and the read image, quality of the printed matter is inspected.

<Detailed Description of Process>

Figure 5:
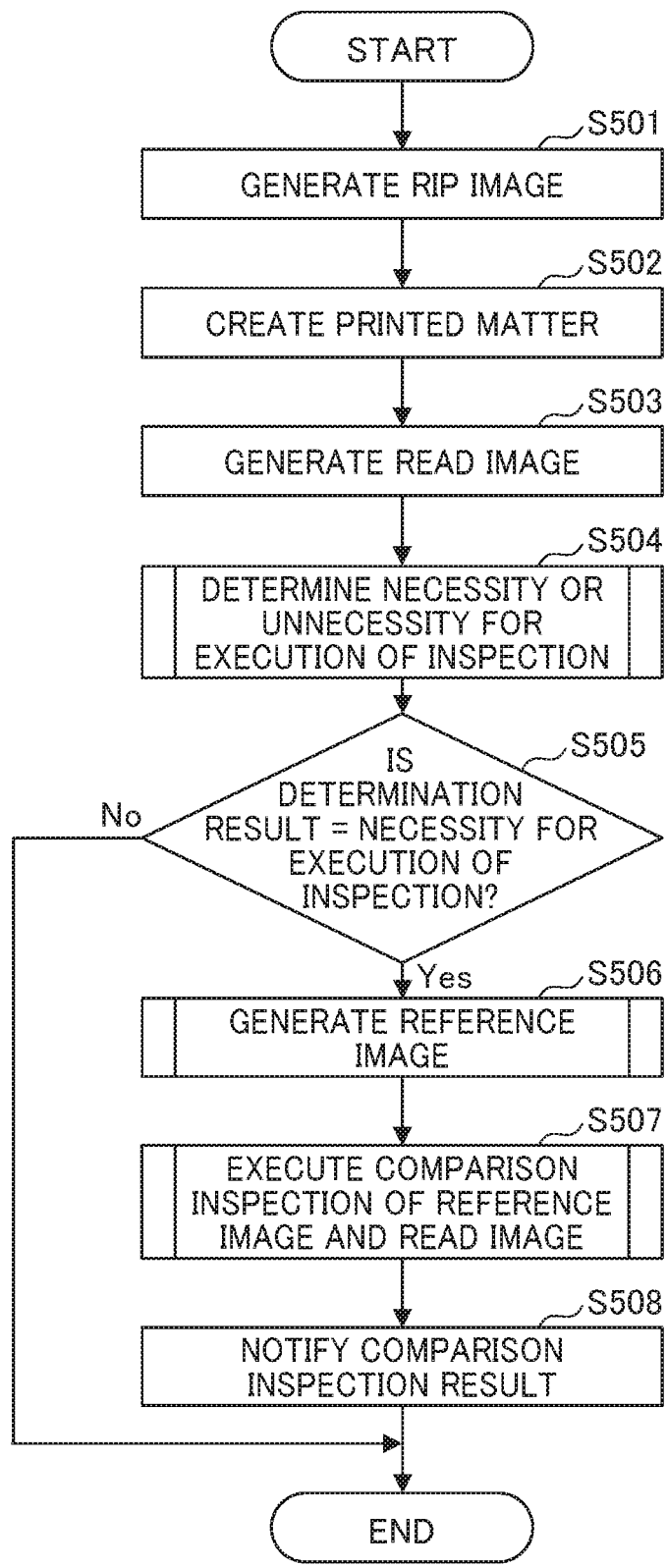
FIG. 5 is a flowchart illustrating one example of a quality inspection process performed by the image forming system according to the first embodiment.

Next, a detailed description is given of a process performed by the image forming system 1 according to the present embodiment. FIG. 5 is a flowchart illustrating one example of an overall process for inspecting quality of printed matter according to the present embodiment.

In step S501, the RIP processor 101 of the DFE 10 generates a RIP image from an image such as an image in a PDL included in a print job. The RIP processor 101 transmits the generated RIP image and a print setting included in the print job to the engine controller 20. Moreover, the RIP processor 101 transmits the generated RIP image and a RIP image size to the inspection apparatus 40.

Subsequently, in step S502, the engine control unit 201 of the engine controller 20, based on the RIP image and the print setting received from the DFE 10, controls the print processor 301 of the print engine 30 to execute image formation output to generate printed matter. That is, upon receipt of the RIP image and the print setting, the print processor 301 generates a print image based on the PIP image and the print setting, and forms the generated print image on a printing sheet, thereby creating printed matter.

If forcible printing is used, the printing sheet size differs from the RIP image size. Herein, if the printing sheet size is larger than the RIP image size, a blank is added to the RIP image according to the printing sheet size to generate a print image. On the other hand, if the printing sheet size is smaller than the RIP image size, the RIP image is partially trimmed according to the printing sheet size to generate a print image.

Therefore, the printed matter with the print image formed on the printing sheet is output according to the print setting. The output printed matter is conveyed to the inspection apparatus 40. Then, the print processor 301 transmits the printing sheet size included in the print setting to the inspection apparatus 40.

In step S503, the reading unit 402 of the inspection apparatus 40 reads the printed matter output from the print engine 30 to generate a read image.

Subsequently, in step S504, the inspection execution determiner 403 of the inspection apparatus 40 determines whether execution of comparison inspection is necessary (i.e., necessity or unnecessity for comparison inspection of a reference image and the read image) for inspection of quality of the printed matter.

Figure 6:
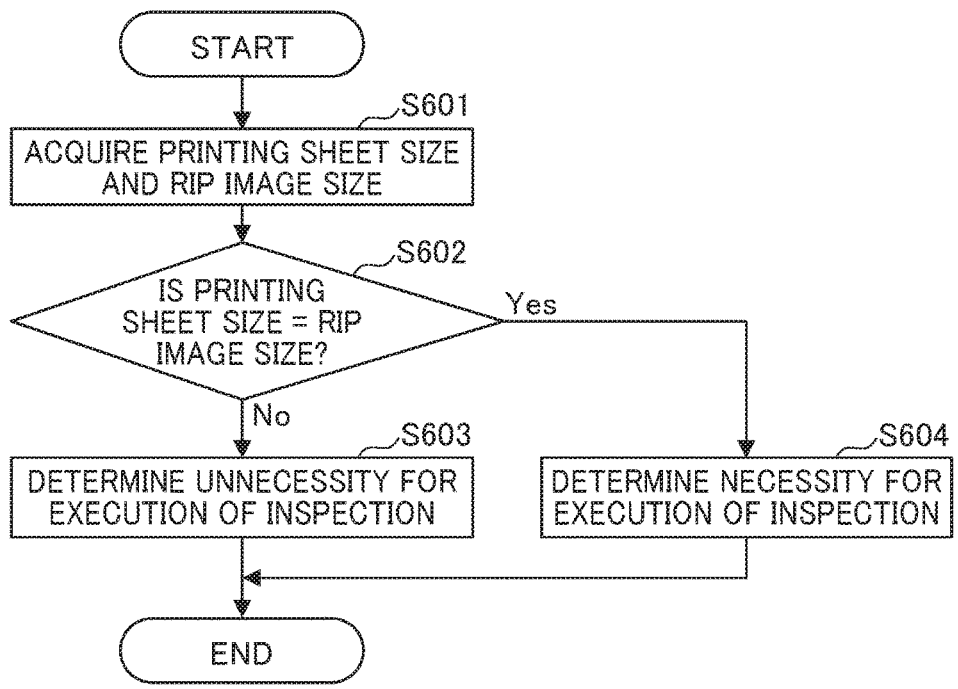
FIG. 6 is a flowchart illustrating one example of a process for determining whether execution of inspection is necessary performed by the image forming system according to the first embodiment.

Herein, the process in step S504 (a process for determining whether execution of inspection is necessary) is described in detail. FIG. 6 is a flowchart illustrating one example of the process for determining whether execution of inspection is necessary according to the embodiment.

In step S601, the inspection execution determiner 403 acquires the printing sheet size transmitted from the print engine 30 and the RIP image size transmitted from the DFE 10.

In step S602, the inspection execution determiner 403 determines whether the printing sheet size and the RIP image size acquired in step S601 are the same.

If the inspection execution determiner 403 determines that the printing sheet size does not match the RIP image size (NO in step S602), the operation proceeds to step S603 in which the inspection execution determiner 403 determines "the unnecessity for execution of inspection".

On the other hand, if the inspection execution determiner 403 determines that the printing sheet size matches the RIP image size (YES in step S602), the operation proceeds to step S604 in which the inspection execution determiner 403 determines "the necessity for execution of inspection".

Accordingly, the inspection apparatus 40 of the present embodiment determines that quality inspection of printed matter is not necessary if a printing sheet size does not match a RIP image size (i.e., if forcible printing is performed). Therefore, in forcible printing by which high quality of printed matter is not demanded in many cases, the inspection apparatus 40 can make a determination such that quality of printed matter is not inspected.

The description returns to FIG. 5. Subsequent to step S504, the operation proceeds to step S505 in which the comparison inspection unit 404 determines whether a result of the determination made by the inspection execution determiner 403 in step S504 is "the necessity for execution of inspection".

If the comparison inspection unit 404 determines that a result of the determination made by the inspection execution determiner 403 is not "the necessity for execution of inspection" (i.e., if a result of the determination is "the unnecessity for execution of inspection") (NO in step S505), the comparison inspection unit 404 finishes the operation. In such a case, quality of the printed matter is not inspected.

On the other hand, if the comparison inspection unit 404 determines that a result of the determination made by the inspection execution determiner 403 is "the necessity for execution of inspection" (YES in step S505), the operation proceeds to step S506 in which the reference image generator 401 generates a reference image for quality inspection of the printed matter.

Figure 7:
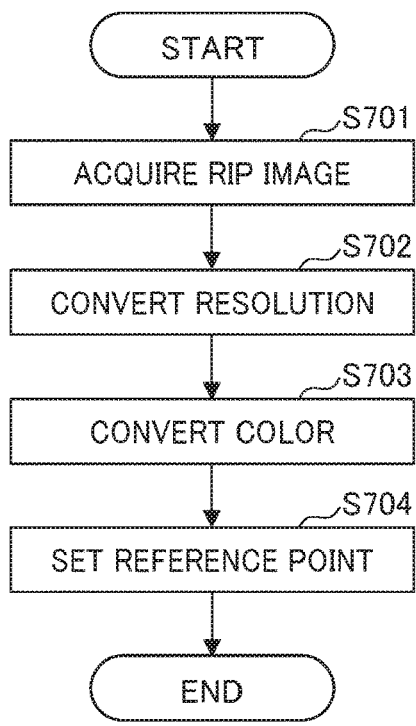
FIG. 7 is a flowchart illustrating one example of a process for generating a reference image performed by the image forming system according to the first embodiment.

Herein, the process in step S506 (a process for generating a reference image) is described in detail. FIG. 7 is a flowchart illustrating one example of the process for generating a reference image according to the present embodiment.

In step S701, the reference image generator 401 acquires the RIP image transmitted from the DFE 10.

Subsequently, in step S702, the reference image generator 401 converts the resolution of the RIP image acquired in the step S701. That is, the reference image generator 401 converts, for example, a resolution of the RIP image from 600 dpi to 200 dpi that is similar to a resolution of the read image.

In step S703, the reference image generator 401 converts the color space of the RIP image into color space substantially the same as the color space of the read image. That is, the reference image generator 401 converts, for example, the RIP image of CMYK into RGB substantially the same as color space of the read image. Color space can be converted using color conversion information. For example, the color conversion information can be acquired by printing and measuring color patches in advance.

In step S704, the reference image generator 401 sets a reference point in the RIP image. The term "reference point" used herein represents a characteristic pixel that is to be a reference to be used for adjustment of positions of a reference image and a read image. The reference image generator 401 can provide a predetermined marker (e.g., a registration marker) to be used for adjustment of positions of a reference image and a read image to the RIP image.

Thus, the reference image is generated from the RIP image by the operations from steps S701 to S704.

The description returns to FIG. 5. Subsequent to step S506, the operation proceeds to step S507 in which the comparison inspection unit 404 executes comparison inspection of the reference image generated in step S506 and the read image generated in step S503. With the comparison inspection of the reference image and the read image, quality of the printed matter is inspected.

Figure 8:
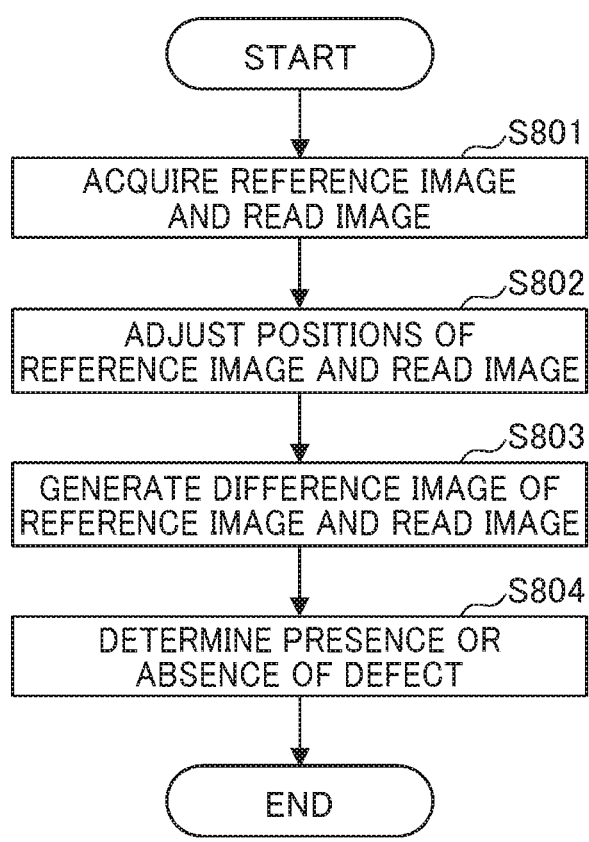
FIG. 8 is a flowchart illustrating one example of a comparison inspection process performed by the image forming system according to the first embodiment.

Herein, the operation (the comparison inspection process) in step S507 is described in detail. FIG. 8 is a flowchart illustrating one example of the comparison inspection process according to the present embodiment.

In step S801, the comparison inspection unit 404 acquires the reference image generated by the reference image generator 401 and the read image generated by the reading unit 402.

In step S802, the comparison inspection unit 404 adjusts positions of the reference image and the read image acquired in step S801. For example, the positions of the reference image and the read image can be adjusted using a reference point set in the reference image.

In step S803, the comparison inspection unit 404 generates a difference image indicating a difference between the reference image and the read image. The term "difference image" used herein represents an image in which a difference in values of each pixel of the reference image and each pixel of the read image is set to a pixel value of each pixel.

Subsequently, in step S804, the comparison inspection unit 404 determines whether the read image has a defect based on a size relation between each pixel value of the difference image generated in the step S803 and a predetermined threshold value. That is, if the number of pixel values greater than the predetermined threshold value is a predetermined number or more, the comparison inspection unit 404 determines that the read image has a defect. With this, quality inspection of the printed matter is completed.

The description returns to FIG. 5. Subsequent to step S507, the operation proceeds to step S508 in which the comparison inspection unit 404 notifies a result of the comparison inspection performed in step S507 (i.e., the presence or absence of a defect in the read image). For example, the comparison inspection unit 404 can notify the engine controller 20 or the user terminal 50 of a result of the comparison inspection. In the present embodiment, the engine controller 20 is notified. Thus, control is performed such that the RIP image is reprinted, for example, if the read image has a defect.

Accordingly, if the RIP image size does not match the printing sheet size (i.e., forcible printing is performed), the inspection apparatus 40 of the present embodiment performs control such that quality of the printed matter is not inspected. Thus, if forcible printing by which high quality of printed matter is not demanded in many cases is performed, the inspection apparatus 40 of the present embodiment can reduce execution of unnecessary inspection, thereby preventing degradation in productivity due to execution of the unnecessary inspection.

The flowchart illustrated in FIG. 5 has been described using the example in which a reference image is generated if a result of the determination made by the inspection execution determiner 403 is "the necessity for execution of inspection". However, alternatively the process for generating a reference image can be executed prior to step S505. That is, the process for generating a reference image can be executed at an earlier time as long as before the comparison inspection in step S507 is executed.

Second Embodiment

A second embodiment is now described.

In the first embodiment, quality of printed matter is not inspected if a RIP image size does not match a printing sheet size (i.e., if forcible printing is used). However, in some cases, a user may intend printed matter to undergo quality inspection even if forcible printing is used.

The present embodiment is described using an example in which an inspection apparatus further determines whether quality of printed matter is inspected according to information set by a user if a RIP image size does not match a printing sheet size.

In the present embodiment, components and configurations that differ from components and configurations of the first embodiment are mainly described, and like components are given the same reference numerals as above and description of such components is omitted.

<Functional Configuration of Image Forming System 1>

Figure 9:
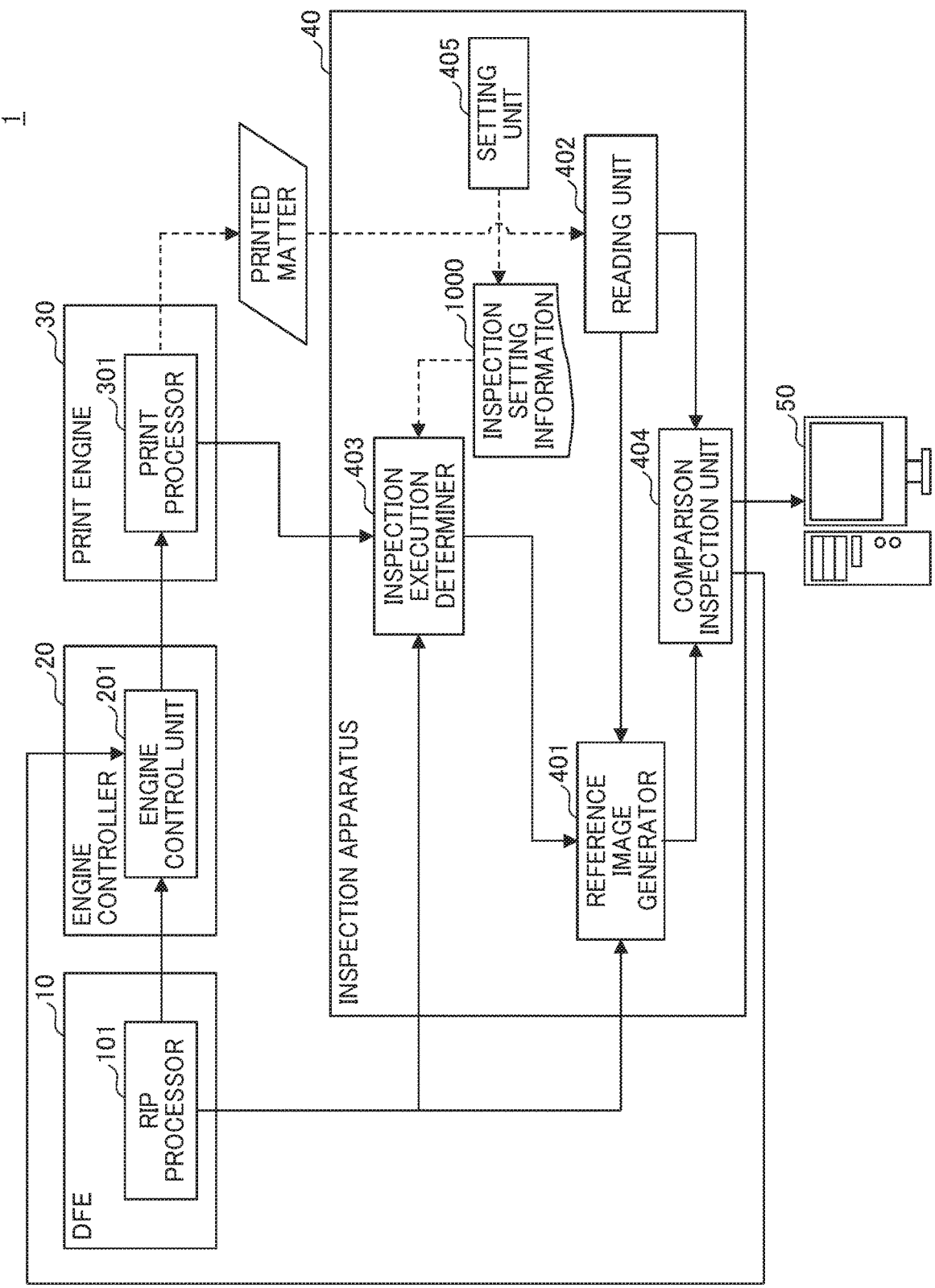
FIG. 9 is a diagram illustrating one example of a functional configuration of an image forming system according to a second embodiment.

FIG. 9 illustrates one example of a functional configuration of an image forming system 1 of the second embodiment. Since configurations of a DFE 10, an engine controller 20, and a print engine 30 of the present embodiment are similar to the configurations described in the first embodiment, description of each of the DFE 10, the engine controller 20, and the print engine 30 is omitted.

<<Inspection Apparatus 40>>

As illustrated in FIG. 9, an inspection apparatus 40 includes a setting unit 405 in addition to the components described in the first embodiment. The setting unit 405 functions by a process in which one or more programs installed in the inspection apparatus 40 are executed by the CPU 41.

If a RIP image size does not match a printing sheet size, the setting unit 405 sets inspection setting information 1000 indicating whether comparison inspection that compares a RIP image with a read image is executed. The inspection setting information 1000 set by the setting unit 405 is stored, for example, in a predetermined storage area in an HDD 44.

Moreover, an inspection execution determiner 403 of the present embodiment refers to the inspection setting information 1000 to determine whether the comparison inspection is executed if the RIP image size does not match the printing sheet size.

<Detailed Description of Process>

Figure 10:
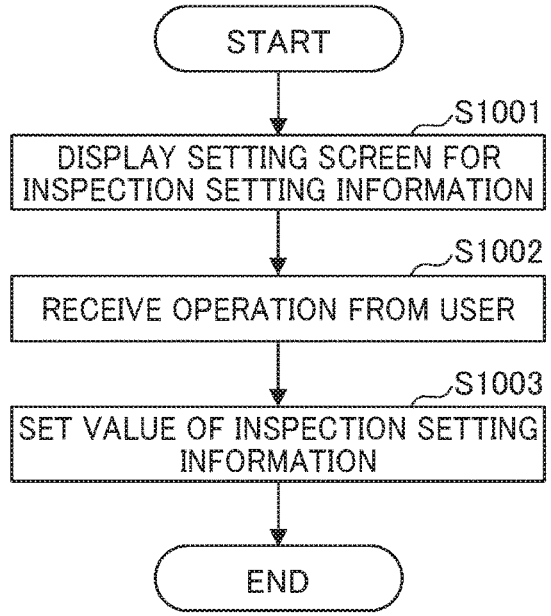
FIG. 10 is a flowchart illustrating one example of a process for setting inspection setting information performed by the image forming system according to the second embodiment.

Next, a process to be performed by the image forming system 1 of the present embodiment is described in detail. First, a process to be performed when a user sets the inspection setting information 1000 is described. FIG. 10 is a flowchart illustrating one example of the process for setting inspection setting information according to the present embodiment.

Figure 11:
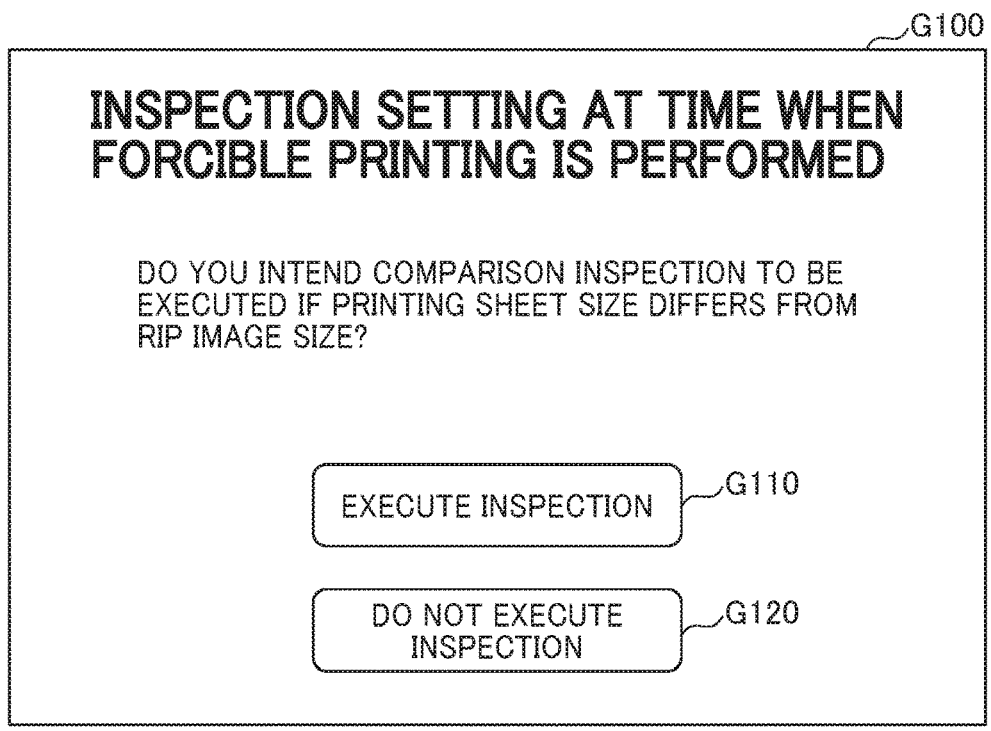
FIG. 11 is a diagram illustrating one example of a setting screen for inspection setting information according to the second embodiment.

In step S1001, the setting unit 405 displays, for example, a setting screen G100 illustrated in FIG. 11 on a LCD 46. The setting screen G100 illustrated in FIG. 11 is a screen used for setting of inspection setting information when a user sets a value of the inspection setting information 1000 (when a user sets either "execution of inspection" or "non-execution of inspection" in the inspection setting information 1000).

The setting screen G100 illustrated in FIG. 11 includes a button G110 for execution of inspection and a button G120 for non-execution of inspection. A press of the button G110 by the user enables "execution of inspection" to be set in the inspection setting information 1000. On the other hand, a press of the button G120 by the user enables "non-execution of inspection" to be set in the inspection setting information 1000. Hereinafter, either the button G110 or the button G120 is pressed by the user.

In FIG. 11, the setting screen G100 for inspection setting information is displayed on the LCD 46 of the inspection apparatus 40. However, the display of the setting screen G100 is not limited to the LCD 46. For example, the setting screen G100 can be displayed on an input output device 61 of the print engine 30.

In step S1002, the setting unit 405 receives a pressing operation from the user (i.e., a press of the button G110 or a press of the button G120).

Subsequently, in step S1003, the setting unit 405 sets a value of the inspection setting information 1000 according to the pressing operation received in step S1002. That is, if the pressing operation received in the step S1002 is a press of the button G110, the setting unit 405 sets "execution of inspection" in the inspection setting information 1000. On the other hand, if the pressing operation received in the step S1002 is a press of the button G120, the setting unit 405 sets "non-execution of inspection" in the inspection setting information 1000.

Therefore, a value is set in the inspection setting information 1000. A value may be already set in the inspection setting information 1000. In such a case, the setting unit 405 can update the value of the inspection setting information 1000. Moreover, inspection setting information 1000 may not be present. In such a case, the setting unit 405 newly creates inspection setting information 1000, and sets a value to the newly created inspection setting information 1000.

Next, a process for inspecting quality of printed matter is described. In the present embodiment, a process for determining whether execution of inspection is necessary and a process for generating a reference image respectively differ from the process in step S504 and the process in step S506 of the flowchart illustrated FIG. 5 in the above-described first embodiment. Hereinafter, the process for determining whether execution of inspection is necessary and a process for generating a reference image according to the present embodiment are described.

FIG. 12 is a flowchart illustrating one example of the process for determining whether execution of inspection is necessary according to the present embodiment. Since operations in steps S601 and S602 of the flowchart illustrated in FIG. 12 are similar to the operations in S601 and S602 of the flowchart illustrated in FIG. 6, description of such similar operations is omitted.

If a printing sheet size does not match a RIP image size (NO in step S602), the operation proceeds to step S1201 in which the inspection execution determiner 403 determines whether a value of the inspection setting information 1000 is "execution of inspection".

If the value of the inspection setting information 1000 is not "execution of inspection" (NO in step S1201) (i.e., the value of the inspection setting information 1000 is "non-execution of inspection"), the operation proceeds to step S1202. In step S1202, the inspection execution determiner 403 determines "the unnecessity for execution of inspection".

On the other hand, if the value of the inspection setting information 1000 is "execution of inspection" (YES in step S1201), the operation proceeds to step S1203 in which the inspection execution determiner 403 determines "the necessity for execution of inspection".

Accordingly, even if forcible printing is performed, the inspection apparatus 40 determines that quality of printed matter is to be inspected as long as information indicating execution of comparison inspection is set beforehand by the user.

Next, one example of the process for generating a reference image according to the present embodiment is described with reference to a flowchart illustrated in FIG. 13. Since operations in steps S702, S703, and S704 of the flowchart illustrated in FIG. 13 are similar to the operations in S702, S703, and S704 of the flowchart illustrated in FIG. 7, description of such similar operations is omitted.

In step S1301, the reference image generator 401 acquires a RIP image transmitted from the DFE 10 and a printing sheet size transmitted from the print engine 30.

Subsequent to step S702, the operation proceeds to step S1302 in which the reference image generator 401 performs a blank process for adjusting a RIP image size to the printing sheet size acquired in step S1301.

Figure 14A:
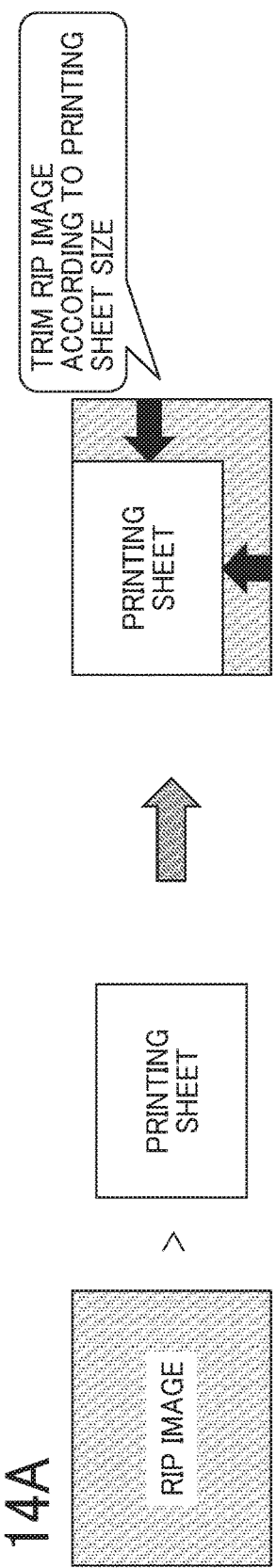
FIGS. 14A, 14B and 14C are diagrams illustrating one example of a blank process.

Herein, one example of the blank process in step S1302 is described with reference to FIGS. 14A-14C. In the present embodiment, even if a RIP image size does not match a printing sheet size, a reference image is generated depending of a value of the inspection setting information 1000. Thus, the RIP image size and the printing sheet size have three relations as follows.

a) RIP image size>printing sheet size
b) RIP image size=printing sheet size
c) RIP image size<printing sheet size As illustrated in FIG. 14A, if a RIP image size is larger than a printing sheet size (RIP image size>printing sheet size), the reference image generator 401 performs a process in which the RIP image is trimmed according to the printing sheet size as a blank process. Such trimming in the blank process is similar to trimming performed when the print processor 301 generates a print image from a RIP image. In the example illustrated in FIG. 14A, a lower area and a right area of the RIP image are trimmed. However, the trimming is not limited to the lower and right areas of the RIP image. For example, upper, lower, left, and right areas of the RIP image can be trimmed according to a printing sheet size.

Figure 14B:
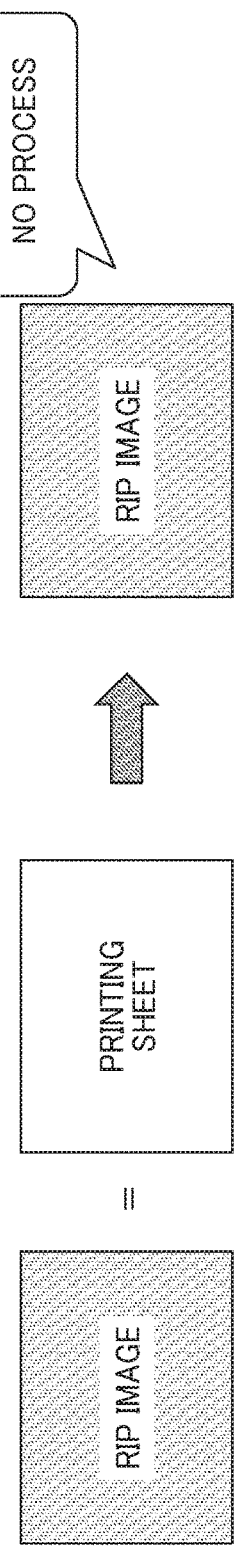

As illustrated in FIG. 14B, if a RIP image size is equal to a printing sheet size (RIP image size=printing sheet size), the reference image generator 401 does not perform a blank process since the RIP image size matches the printing sheet size.

Figure 14C:
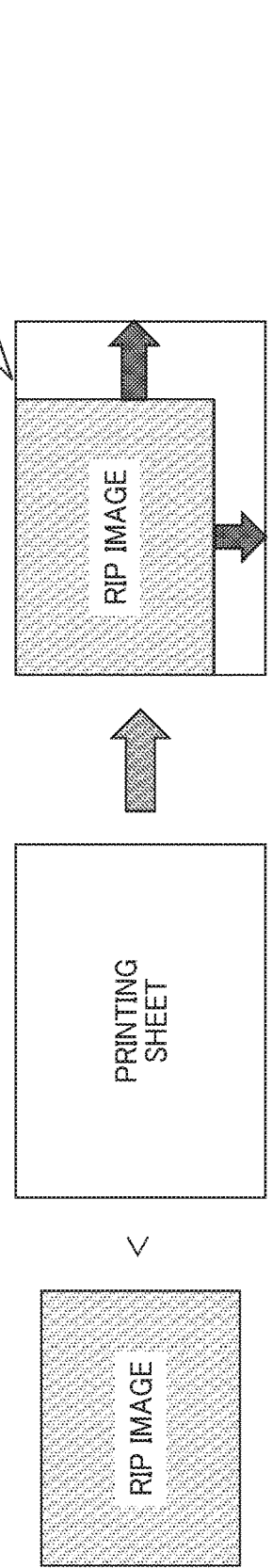

As illustrated in FIG. 14C, if a RIP image size is smaller than a printing sheet size (RIP image size<printing sheet size), the reference image generator 401 adds a blank to a RIP image according to the printing sheet size as a blank process. The addition of a blank in the blank process is similar to addition of a blank when the print processor 301 generates a print image from a RIP image. Although FIG. 14C illustrates an example in which a blank is added to each of a lower side and a right side of the RIP image, the addition of a blank is not limited to each of the lower and right sides of the RIP image. For example, a blank can be added to areas in lower, upper, right, and left directions according to a printing sheet size.

Accordingly, if a printing sheet size differs from a RIP image size, a RIP image is trimmed or a blank is added to the RIP image according to the printing sheet size to generate a reference image, as similar to the case where a print image is generated from a RIP image. On the other hand, if a printing sheet size does not differ from a RIP image size, trimming is not performed or a blank is not added.

Third Embodiment

Next, a third embodiment is described.

The second embodiment has been described using an example in which the inspection apparatus 40 determines whether to inspect quality of printed matter according to information set by a user if a RIP image size does not match a printing sheet size.

If the printing sheet size is larger than the RIP image size, a blank is added to the RIP image and then printing is performed. In such a case, the RIP image is not trimmed, unlike the case where a RIP image size is larger than a printing sheet size. Thus, high quality of printed matter can be demanded even if forcible printing is performed.

The third embodiment is described using an example in which a user sets execution of quality inspection of printed matter if a printing sheet size is larger than a RIP image size.

In the present embodiment, components and configurations that differ from components and configurations of the second embodiment are mainly described, and like components are given the same reference numerals as above and description of such components is omitted.

<Detailed Description of Process>

Figures 15, 16:
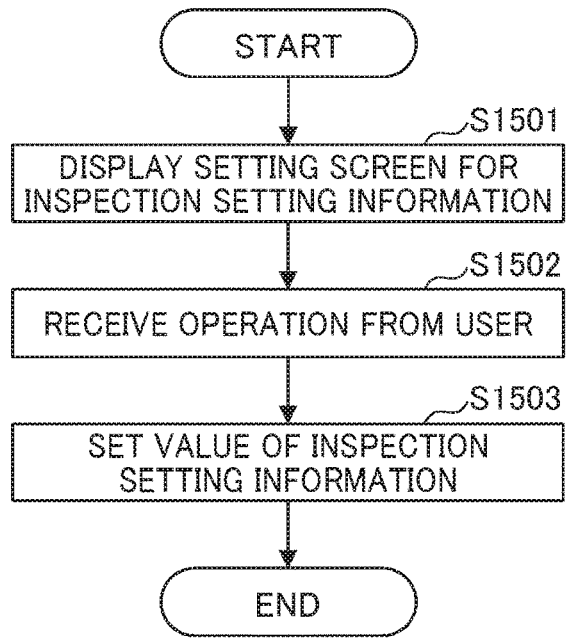
FIG. 15 is a flowchart illustrating one example of a process for setting inspection setting information performed by an image forming system according to a third embodiment.
FIG. 16 is a diagram illustrating one example of a setting screen for inspection setting information according to the third embodiment.

Next, a detailed description is given of a process performed by an image forming system 1 according to the third embodiment. First, a process to be performed when a user sets inspection setting information 1000 is described. FIG. 15 is a flowchart illustrating one example of a process for setting inspection setting information according to the present embodiment.

In step S1501, a setting unit 405 displays, for example, a setting screen G200 as illustrated in FIG. 16 on a LCD 46. The setting screen G200 illustrated in FIG. 16 is a screen used for setting of inspection setting information when a user sets a value of the inspection setting information 1000 (when a user sets "execution of inspection", "partial execution of inspection", or "non-execution of inspection" in the inspection setting information 1000).

The setting screen G200 illustrated in FIG. 16 includes a button G210 for execution of inspection, a button G220 for partial execution of inspection, and a button G230 for non-execution of inspection. A press of the button G210 by the user enables "execution of inspection" to be set in the inspection setting information 1000. Moreover, a press of the buttons G220 by the user enables "partial execution of inspection" to be set in the inspection setting information 1000, whereas a press of the buttons G230 enables "non-execution of inspection" to be set in the inspection setting information 1000. Hereinafter, any of the buttons G210, G220, and G230 is pressed by the user.

In FIG. 16, the setting screen G200 for inspection setting information is displayed on the LCD 46 of an inspection apparatus 40. However, the display of the setting screen G200 is not limited to the LCD 46. For example, the setting screen G200 can be displayed on an input output device 61 of a print engine 30.

In step S1502, the setting unit 405 receives a pressing operation from the user (i.e., a press of the button G210 for execution of inspection, a press of the button G220 for partial execution of inspection, or a press of the button G230 for non-execution of inspection).

Subsequently, in step S1503, the setting unit 405 sets a value in the inspection setting information 1000 according to the pressing operation received in step S1502. That is, for example, if the pressing operation received in the step S1502 is a press of the button G210, the setting unit 405 sets "execution of inspection" in the inspection setting information 1000. If the pressing operation received in the step S1502 is a press of the button G220, the setting unit 405 sets "partial execution of inspection" in the inspection setting information 1000. Moreover, if the pressing operation received in the step S1502 is a press of the button G230, the setting unit 405 sets "non-execution of inspection" in the inspection setting information 1000.

Therefore, a value is set in the inspection setting information 1000. For example, a value may already be set in the inspection setting information 1000. In such a case, the setting unit 405 can update the value of the inspection setting information 1000. A value of the inspection setting information 1000 may not be present. In such a case, the setting unit 405 newly creates inspection setting information 1000, and sets a value to the newly created inspection setting information 1000.

Figure 17:
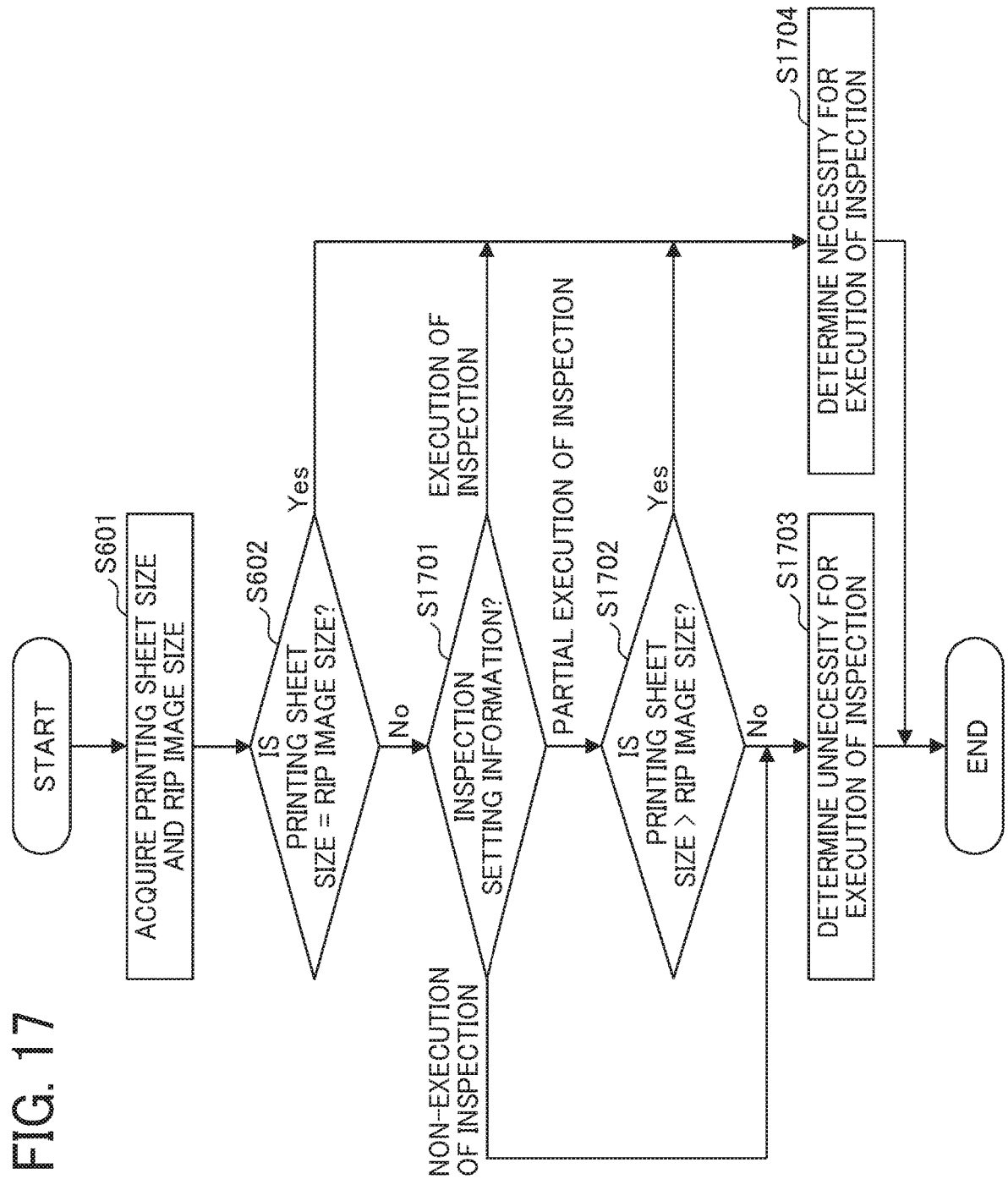
FIG. 17 is a flowchart illustrating one example of a process for determining whether execution of inspection is necessary performed by the image forming system according to the third embodiment.

Next, a process for inspecting quality of printed matter is described. In the present embodiment, a process for determining whether execution of inspection is necessary differs from the process in step S504 of the flowchart illustrated FIG. 5 in the second embodiment. FIG. 17 is a flowchart illustrating one example of the process for determining whether execution of inspection is necessary according to the present embodiment. Since operations in step S601 and S602 of the flowchart illustrated in FIG. 17 are similar to the operations in step S601 and S602 of the flowchart illustrated in FIG. 6, description of such similar operations is omitted.

If a printing sheet size does not match a RIP image size (NO in step S602), the operation proceeds to step S1701 in which the inspection execution determiner 403 determines whether a value of the inspection setting information 1000 is any of "execution of inspection", "partial execution of inspection", and "non-execution of inspection".

If the inspection execution determiner 403 determines that the value of the inspection setting information 1000 is "partial execution of inspection" (partial execution of inspection in step S1701), the operation proceeds to step S1702. In step S1702, the inspection execution determiner 403 determines whether a printing sheet size is larger than a RIP image size.

If the inspection execution determiner 403 determines that the printing sheet size is not larger than the RIP image (i.e., the printing sheet size is smaller than the RIP image size) (NO in step S1702), the operation proceeds to step S1703 in which the inspection execution determiner 403 determines "the unnecessary for execution of inspection". Herein, such a determination is made since a print image acquired by trimming the RIP image has been generated in step S502 of the flowchart illustrated in FIG. 5.

On the other hand, if the inspection execution determiner 403 determines that the printing sheet size is larger than the RIP image (YES in step S1702), the operation proceeds to step S1704 in which the inspection execution determiner 403 determines "the necessity for execution of inspection". Herein, such a determination is made since a print image acquired by adding a blank to the RIP image has been generated in step S502 of the flowchart illustrated in FIG. 5.

Therefore, even if forcible printing is performed, the inspection apparatus 40 of the present embodiment determines that quality of printed matter is inspected as long as a value of the inspection setting information 1000 is "partial execution of inspection" and a printing sheet size is larger than a RIP image size.

Fourth Embodiment

Next, a fourth embodiment is described.

The third embodiment has been described using an example in which quality of printed matter is inspected as long as a blank is added to a RIP image even if a RIP image size does not match a printing sheet size.

Even if a RIP image is trimmed, for example, if an area in which elements such as text or graphics are not included is trimmed (e.g., only background is trimmed), it is conceivable that quality inspection of printed matter is demanded.

Accordingly, the fourth embodiment is described using an example in which quality of printed matter is inspected even if a printing sheet size is smaller than a RIP image size, for example, if only background is trimmed so that printing is performed.

In the fourth embodiment, components and configurations that differ from components and configurations of the third embodiment are mainly described, and like components are given the same reference numerals as above and description of such components is omitted.

<Detailed Description of Process>

Figure 18:
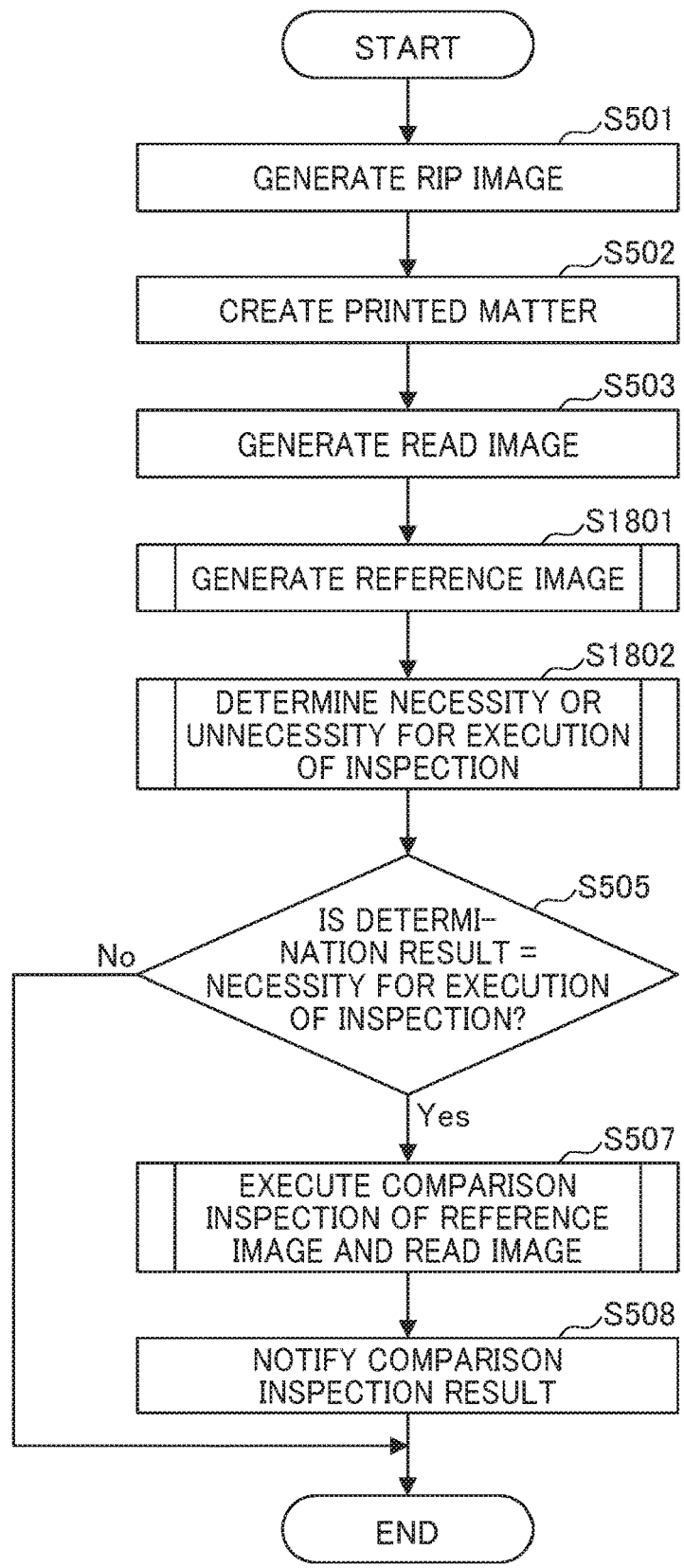
FIG. 18 is a flowchart illustrating one example of a quality inspection process performed by an image forming system according to a fourth embodiment.

A process to be performed by an image forming system 1 of the present embodiment is described in detail. FIG. 18 is a flowchart illustrating one example of an overall process for inspecting quality of printed matter according to the present embodiment. Since operations in steps S501 through S503 and steps S505 through S508 of the flowchart illustrated in FIG. 18 are similar to the operations in steps S501 through S503 and steps S505 through S508 of the flowchart illustrated in FIG. 5, description of such similar operations is omitted.

Subsequent to step S503, the operation proceeds to step S1801 in which a reference image generator 401 generates a reference image for quality inspection of printed matter. A process for generating the reference image is similar to the process described above with reference to FIG. 13.

In step S1802, the inspection execution determiner 403 determines whether comparison inspection for inspection of quality of printed matter is necessary.

Therefore, in the quality inspection process according to the present embodiment, the process for generating a reference image is performed before the process for determining whether execution of inspection is necessary so that a result of a blank process in the reference image generation process is used in the process for determining whether execution of inspection is necessary.

Figure 19:
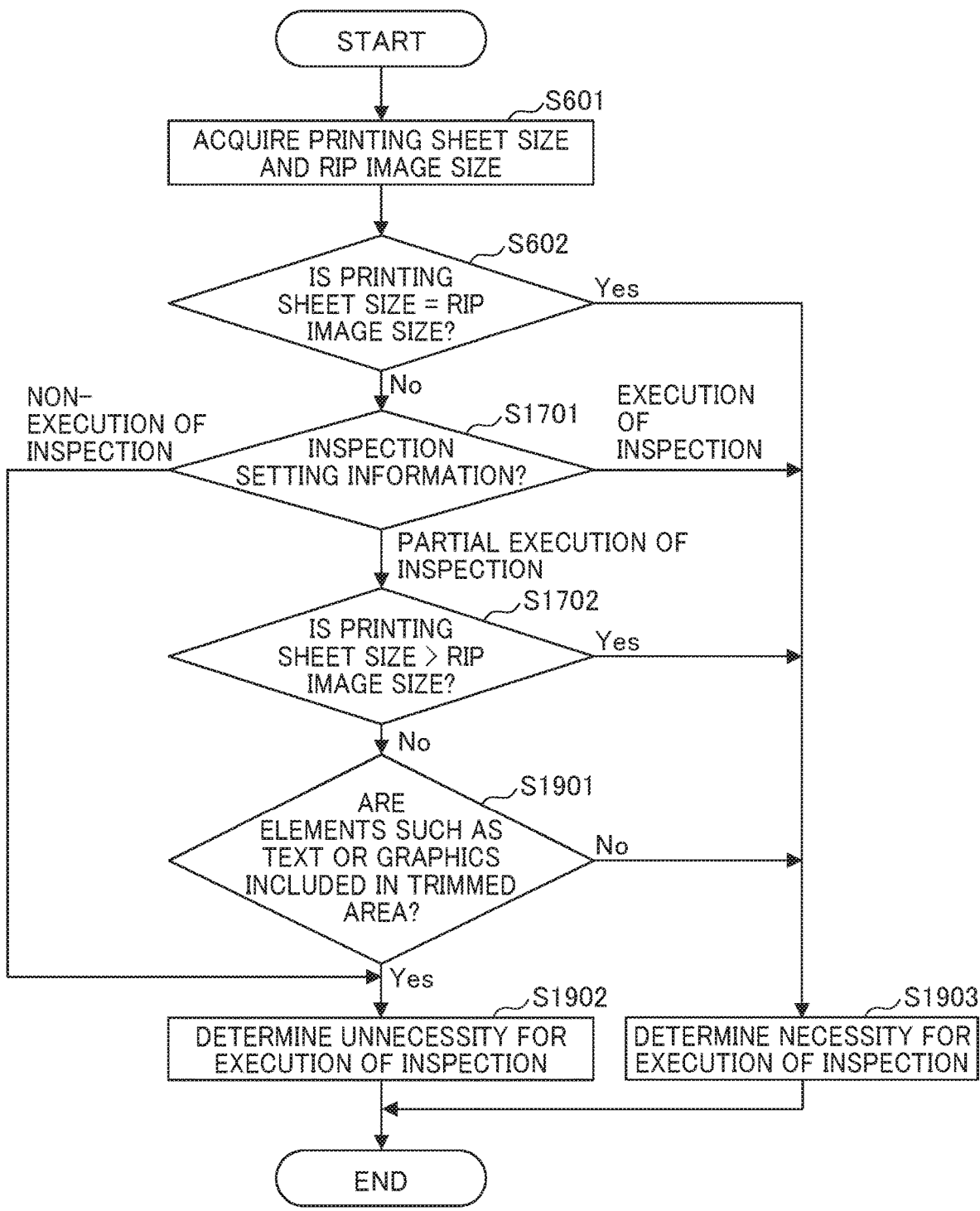
FIG. 19 is a flowchart illustrating one example of a process for determining whether execution of inspection is necessary performed by the image forming system according to the fourth embodiment.

Herein, the operation (the process for determining whether execution of inspection is necessary) in step S1802 is described in detail. FIG. 19 is a flowchart illustrating one example of the process for determining whether execution of inspection is necessary according to the fourth embodiment. Since operations in step S601, S602, S1701, and S1702 of the flowchart illustrated in FIG. 19 are similar to the operations in step S601, S602, S1701, and S1702 of the flowchart illustrated in FIG. 17, description of such similar operations is omitted.

If a printing sheet size is not larger than a RIP image size (NO in step S1702), the operation proceeds to step S1901. In step S1901, the inspection execution determiner 403 determines whether elements such as text or graphics are included in the area trimmed in step S1302 (the black process) of the flowchart illustrated in FIG. 13.

Herein, for example, the inspection execution determiner 403 can determine whether the trimmed area has a colored pixel to determine whether elements such as text or graphic are included in the trimmed area. For example, the presence or absence of a colored pixel can be determined based on whether each pixel in the trimmed area is white. If the trimmed area has a pixel the color of which is other than white, the presence of the colored pixel is determined. Accordingly, if ground color (background) of a RIP image is white, the inspection execution determiner 403 can determine whether elements such as text or graphics (at least one portion of elements such as text or graphics) are included in the trimmed area.

Moreover, the inspection execution determiner 403 can determine whether elements such as text or graphics are included in the trimmed area by, for example, determining whether the variance of pixel values of pixels in the trimmed area is a predetermined value or more. Such determination is performed as elements such as text or graphics are more likely to be included in the trimmed area if the variance of pixel values of pixels in the trimmed area is large. The use of variance can determine whether elements such as text or graphics are included in a trimmed area even if ground color (background) of a RIP image is other than white.

If elements such as text or graphics are included in the trimmed area (YES in step S1901), the operation proceeds to step S1902 in which the inspection execution determiner 403 determines "the unnecessity for execution of inspection". Herein, such a determination is made since a print image acquired by trimming an area having the element such as a character and graphic in the RIP image been generated in step S502 of the flowchart illustrated in FIG. 5.

On the other hand, if elements such as text or graphics are not included in the trimmed area (NO in step S1901), the operation proceeds to step S1903 in which the inspection execution determiner 403 determines "the necessity for execution of inspection". Herein, such a determination is made since a print image acquired by trimming an area having no element such as a character and graphic in the RIP image has been generated in step S502 of the flowchart illustrated in FIG. 5.

Accordingly, even if forcible printing is performed, and a printing sheet size is smaller than a RIP image size, the inspection apparatus 40 of the present embodiment determines that quality of a printed product is to be executed as long as elements such as text or graphics in a RIP image are not trimmed.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The present disclosure has been described above with reference to specific embodiments but is not limited thereto. Various modifications and enhancements are possible without departing from scope of the disclosure. It is therefore to be understood that the present disclosure may be practiced otherwise than as specifically described herein. For example, elements and/or features of different illustrative embodiments may be combined with each other and/or substituted for each other within the scope of the present disclosure.

What is claimed is:

1. An inspection apparatus comprising:
   a reader configured to read printed matter included with an image printed on a printing medium, based on a source image, to generate a read image; and
   a processor configured to generate a reference image based on the source image, determine whether an inspection is to be executed based on a size of the source image and a size of the printing medium, and compare the reference image with the read image to inspect quality of the printed matter, in response to determining that the inspection is to be executed,
   wherein the processor is configured to determine that the inspection is to be executed upon the size of the source image matching the size of the printing medium, and
   wherein the processor is configured to determine that the inspection is not to be executed upon the size of the source image not matching the size of the printing medium.

2. The inspection apparatus of claim 1, wherein the processor is configured to set inspection setting information containing a value, the value indicating execution of the inspection or non-execution of the inspection, and
   wherein the processor is configured to determine that the inspection is to be executed upon the size of the source image not matching the size of the printing medium and upon the value of the inspection setting information indicating the execution of the inspection.

3. The inspection apparatus of claim 2, wherein the value indicates the execution of the inspection, the non-execution of the inspection, or partial execution of the inspection, and
   wherein the processor is configured to determine that the inspection is to be executed upon the size of the printing medium being larger than the size of the source image, and upon the value of the inspection setting information indicating the partial execution of the inspection.

4. An inspection system comprising the inspection apparatus of claim 2.

5. The inspection system of claim 4, further comprising:
   a print processor configured to print an image on a printing medium; and
   engine control circuitry configured to control the print processor.

6. The inspection apparatus of claim 1, wherein the processor is configured to set inspection setting information containing a value, the value indicating execution of the inspection, non-execution of the inspection, or partial execution of the inspection, and
   wherein the processor is configured to determine that the inspection is to be executed upon the size of the printing medium being larger than the size of the source image, and upon the value of the inspection setting information indicating the partial execution of the inspection.

7. The inspection apparatus of claim 1, wherein the processor is configured to delete at least a partial area of the source image to generate the reference image upon the size of the source image being larger than the size of the printing medium, and
   wherein the processor is configured to determine whether the inspection is to be executed based on a pixel included in the deleted at least partial area deleted, upon the size of the source image being large than the size of the printing medium.

8. The inspection apparatus of claim 7, wherein the processor is configured to determine that the inspection is not to be executed upon the size of the source image being larger than the size of the printing medium and upon the at least partial area deleted including a pixel other than a white pixel.

9. The inspection apparatus of claim 7, wherein the processor is configured to determine that the inspection is not to be executed upon the size of the source image being larger than the size of the printing medium and upon a variance of pixel values of pixels included in the at least partial area deleted being equal to or greater than a threshold value.

10. An inspection system comprising the inspection apparatus of claim 1.

11. The inspection system of claim 10, further comprising:
    a print processor configured to print an image on a printing medium; and
    engine control circuitry configured to control the print processor.

12. An inspection method comprising:
    reading printed matter included with an image printed on a printing medium, based on a source image, to generate a read image;
    generating a reference image based on the source image;
    determining whether an inspection is to be executed based on a size of the source image and a size of the printing medium; and
    comparing the reference image with the read image to inspect quality of the printed matter, in response to the determining indicating that the inspection is to be executed, the determining including
       determining that the inspection is to be executed upon the size of the source image matching the size of the printing medium, and
       determining that the inspection is not to be executed upon the size of the source image not matching the size of the printing medium.

13. The inspection method of claim 12, further comprising:
    setting inspection setting information containing a value, the value indicating execution of the inspection or non-execution of the inspection, and
    wherein the determining that the inspection is to be executed includes determining that the size of the source image does not match the size of the printing medium and that the value of the inspection setting information indicates the execution of the inspection.

14. The inspection method of claim 12, further comprising:
setting inspection information containing a value, the value indicating execution of the inspection, non-execution of the inspection, or partial execution of the inspection, and
wherein the determining that the inspection is to be executed includes determining that the size of the printing medium is larger than the size of the source image, and that the value of the inspection setting information indicates the partial execution of the inspection.

15. The inspection method of claim 12, further comprising:
deleting at least a partial area of the source image to generate the reference image, upon the size of the source image being larger than the size of the printing medium, and
wherein the determining whether the inspection is to be executed includes determining that the inspection is to be executed based on a pixel included in the at least partial area deleted, upon the size of the source image being larger than the size of the printing medium.

16. The inspection method of claim 15, wherein the determining whether the inspection is to be executed includes determining that the inspection is not to be executed upon the size of the source image being larger than the size of the printing medium and upon the at least partial area deleted including a pixel other than a white pixel.

17. The inspection method of claim 15, wherein the determining whether the inspection is to be executed includes determining that the inspection is not to be executed upon the size of the source image being larger than the size of the printing medium and upon a variance of pixel values of pixels included in the at least partial area deleted being equal to or greater than a threshold value.

18. An inspection apparatus comprising:
a reader configured to read printed matter included with an image printed on a printing medium, based on a source image, to generate a read image; and
a processor configured to generate a reference image based on the source image, determine whether an inspection is to be executed based on a size of the source image and a size of the printing medium, and compare the reference image with the read image to inspect quality of the printed matter, in response to determining that the inspection is to be executed,
wherein the processor is further configured to delete at least a partial area of the source image to generate the reference image upon the size of the source image being larger than the size of the printing medium, and
wherein the processor is further configured to determine whether the inspection is to be executed based on a pixel included in the at least partial area deleted, upon the size of the source image being larger than the size of the printing medium.

19. An inspection method comprising:
reading printed matter included with an image printed on a printing medium, based on a source image, to generate a read image;
generating a reference image based on the source image;
determining whether an inspection is to be executed based on a size of the source image and a size of the printing medium; and
comparing the reference image with the read image to inspect quality of the printed matter, in response to the determining indicating that the inspection is to be executed,
wherein the inspection method further includes
deleting at least a partial area of the source image to generate the reference image upon the size of the source image being larger than the size of the printing medium, and
determining whether the inspection is to be executed based on a pixel included in the at least partial area deleted, upon the size of the source image being larger than the size of the printing medium.

* * * * *